(12) United States Patent
Mauer et al.

(10) Patent No.: US 6,944,577 B1
(45) Date of Patent: Sep. 13, 2005

(54) METHOD AND APPARATUS FOR EXTRACTING DATA FROM AN OVERSAMPLED BIT STREAM

(75) Inventors: Volker Mauer, High Wycombe (GB); James Tyson, Slough (GB)

(73) Assignee: Altera Corporation, San Jose, CA (US)

(*) Notice: Subject to any disclaimer, the term of this patent is extended or adjusted under 35 U.S.C. 154(b) by 40 days.

(21) Appl. No.: 10/728,228

(22) Filed: Dec. 3, 2003

(51) Int. Cl.[7] ............................................... G06F 15/00
(52) U.S. Cl. ..................... 702/189; 702/187; 702/190
(58) Field of Search ................................. 702/182, 183, 702/186, 187, 189, 190, 196; 700/2, 7; 710/8, 10, 23; 341/122, 123

(56) References Cited

U.S. PATENT DOCUMENTS

| | | | | |
|---|---|---|---|---|
| 5,960,388 A | * | 9/1999 | Nishiguchi et al. | 704/208 |
| 6,198,420 B1 | * | 3/2001 | Ryan et al. | 341/155 |
| 6,529,148 B1 | * | 3/2003 | Maddux | 341/100 |
| 6,636,816 B1 | * | 10/2003 | Dvorak et al. | 702/66 |

* cited by examiner

*Primary Examiner*—Bryan Bui
(74) *Attorney, Agent, or Firm*—Townsend and Townsend and Crew LLP

(57) ABSTRACT

Apparatus and method extract data from a data stream. The method includes oversampling the data stream, performing first processing on adjacent bits of the oversampled data stream, performing second processing the results of the first processing, comparing the results of the second processing, and selecting an alignment of data based on the comparison. The method can be efficiently implemented using accumulators, delay elements, and XOR elements. In this manner, data may be extracted from the data stream despite a varying or unknown phase or duty cycle, or in the presence of jitter.

25 Claims, 3 Drawing Sheets

METHOD AND APPARATUS FOR EXTRACTING DATA FROM AN OVERSAMPLED BIT STREAM

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

A data stream is often conceptualized as consisting of discrete values. For example, a binary data stream may be represented by the symbols {1, −1} or {1, 0}. The data stream would then be conceptualized as a string of binary symbols, for example, 10001110100101.

However, in the real world, the data stream is in actuality an analog representation of the discrete values. Extracting the discrete values from the analog data stream can be difficult, especially when the phase and duty cycle of the data stream are varying or unknown. Jitter can also negatively impact accurate data extraction.

Programmable logic devices (PLDs) are integrated circuit devices that often include input/output (I/O) components, memory components, and processing components (such as microprocessors and digital signal processors [DSPs]) in configurable arrangements. A particular PLD, then, may be configured in many different ways that each correspond to a different application. Thus, a data stream received by a PLD may come from a variety of sources, the variety being a function of the wide variety of different applications.

There is a need for a device that accurately extracts discrete values from a data stream. There is a need for such a device that can respond flexibly to a variety of data streams resulting from a wide variety of PLD implementations. There is a need for such a device that is quick, is efficient, and may be implemented with a small number of components.

BRIEF SUMMARY OF THE INVENTION

Embodiments of the present invention are directed toward extracting data from a data stream that may have an unknown or varying phase or duty cycle, or that may have jitter.

According to an embodiment of the present invention, a method extracts data from a data stream. The method includes oversampling the data stream at an oversampling rate and generating data samples. The method further includes processing the data samples and generating first results, wherein the data samples are processed such that two or more adjacent data samples are processed together, and wherein the number of adjacent sampled processed together corresponds to the oversampling rate. The method further includes processing the first results over time and generating second results, wherein each of the first results is processed with others of the first results such that the number of second results corresponds to the oversampling rate. The method further includes analyzing the second results and selecting an alignment of the data samples according to one of the second results.

According to another embodiment of the present invention, an apparatus extracts data from a data stream. The apparatus includes an oversampler, a first group of processing elements, a second group of processing elements, and a comparator element. These elements perform as described above regarding the method.

According to another embodiment of the present invention, a method extracts data from a data stream. The method is similar to the method described above, with the addition of processing a set of data samples according to a mirror axis of the set.

According to another embodiment of the present invention, an apparatus extract data from a data stream. The apparatus is similar to the apparatus described above, with the addition of processing a set of data samples according to a mirror axis of the set.

According to another embodiment of the present invention, a programmable logic device includes function blocks, an interconnect, and a data extractor circuit as described in the embodiments above.

According to embodiments of the present invention, the number of processing elements corresponds to the oversampling rate.

In this manner, data may be extracted from the data stream despite a varying or unknown phase or duty cycle, or in the presence of jitter.

A fuller description of the embodiments of the present invention is provided with reference to the following drawings and related description.

DETAILED DESCRIPTION OF THE INVENTION

Figure 1:
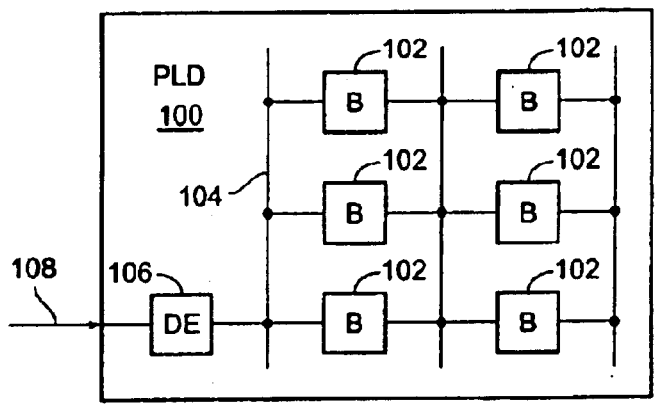
FIG. 1 is a block diagram of a PLD that includes a data extractor according to an embodiment of the present invention.

FIG. 1 is a block diagram of a PLD 100 according to an embodiment of the present invention. The PLD 100 includes numerous function blocks 102, an interconnect 104, and various input and output interfaces (not shown). The function blocks 102 perform various functions, such as memory, signal processing, input/output, microprocessing, etc. The interconnect 104 connects the various function blocks 102 to each other and to the input and output interfaces. A user may then configure the PLD to perform various functions according to which function blocks 102 are selected for use and how the selected blocks are connected via the interconnect 104.

The PLD 100 also includes a data extractor 106. (The data extractor may also be considered to be an input interface to the PLD 100.) The data extractor 106 extracts data from an input data stream 108 and provides the extracted data to the components of the PLD.

Because of the wide variety of applications in which the PLD 100 may be used, and imperfections in the generation and transmission of the various signals connected to the PLD, the input data stream 108 may vary widely from an ideal data stream. The input data stream 108 may have an unknown or varying phase and/or duty cycle, and may contain jitter. The data extractor 106 works to overcome these issues in the wide variety of implementations of the PLD 100.

Figure 2:
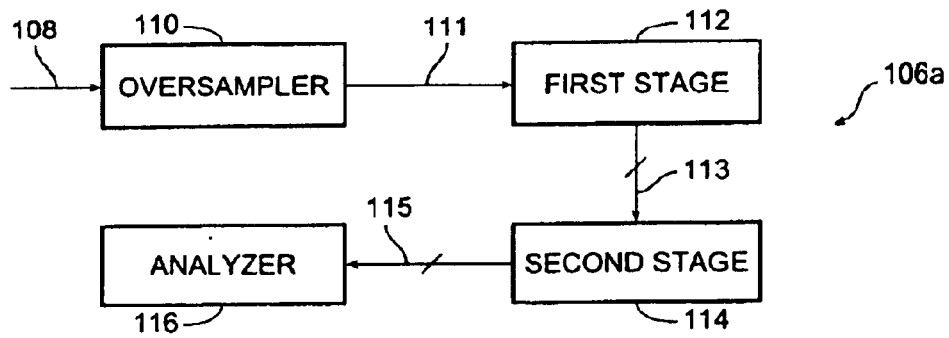
FIG. 2 is a block diagram of a data extractor according to an embodiment of the present invention.

FIG. 2 is a block diagram of a data extractor 106 a according to an embodiment of the present invention. The data extractor 106 a includes an oversampler 110, a first stage 112, a second stage 114, and an analyzer 116.

The oversampler 110 oversamples the input data stream 108 at a designated oversampling rate. For example, if the input data stream 108 has an expected rate of 1 Mbps, and 3= oversampling is desired, the oversampler 110 generates the output data 111 at a rate of 3 Mbps. In such a case, each "bit" of the input data stream 108 is represented by three "bits" of the output data 111.

The first stage 112 performs a first processing step on the output data 111 from the oversampler 110. The first stage 112 is further detailed below with reference to FIGS. 3 and 6–7. In general, the first stage 112 includes a number of accumulator elements that corresponds to the oversampling rate. The first stage 112 outputs intermediate accumulation results 113.

The second stage 114 performs a second processing step on the output 113 from the first stage 112. The second stage 114 is further detailed below with reference to FIG. 4. In general, the second stage 114 includes a number of accumulator elements that corresponds to the oversampling rate. The second stage 114 outputs final accumulation results 115.

The analyzer 116 performs analysis in the final accumulation results 115 and selects the desired alignment of the input data stream 108 based on the analysis. In general, the desired alignment is the one with the highest final accumulation result from the second stage 114. Once the analyzer 116 has determined the desired alignment for the input data stream 108, the data bits corresponding to that alignment may be provided to the other components of the PLD 100. The data bits may be tapped from a desired point in the data extractor 106a, such as from the output 111 of the oversampler 110 or from an internal point in the first stage 112 (see FIG. 3 for more details).

As an example, consider the input data stream D being oversampled, generating the sampled stream B. B consists of elements $b_t = \{+1, -1\}$, using t as the index to indicate the $t^{th}$ bit of the sample stream. (Note that +1 and −1 are "logical" values that may also be represented as the "digital" values 0 and 1.) If the sample stream is ideal, it would always contain n matching bits, where n is the oversampling factor. If the oversampling factor is 3, for example, bits $b_0$, $b_1$ and $b_2$ should be identical; bits $b_3$, $b_4$ and $b_5$ should be identical, etc. The oversampled stream could be:

+1+1+1−1−1−1−1−1+1+1+1−1−1−1 . . .

for the data message:

+1 −1 −1 +1 −1 . . .

In this example, it does not matter where data is sampled. In read systems, however, there are a number of error sources, including phase jitter and duty cycle variations. The sampled data stream could then look as follows:

+1+1+1+1−1−1−1−1+1+1+1+1+1−1−1+1 . . .

In this case, it is important to sample the datastream at the correct time to extract the data message. If the message was extracted from bits 1, 4, 7, . . . , etc. we could get a different message than we would if we extracted the message from samples 2, 5, 8, . . . , etc. or 3, 6, 9, . . . , etc. The task of the synchronization circuit 106 is to find which set of samples is the best set to extract the data message from, without any prior knowledge of what the data message is.

Figure 3:
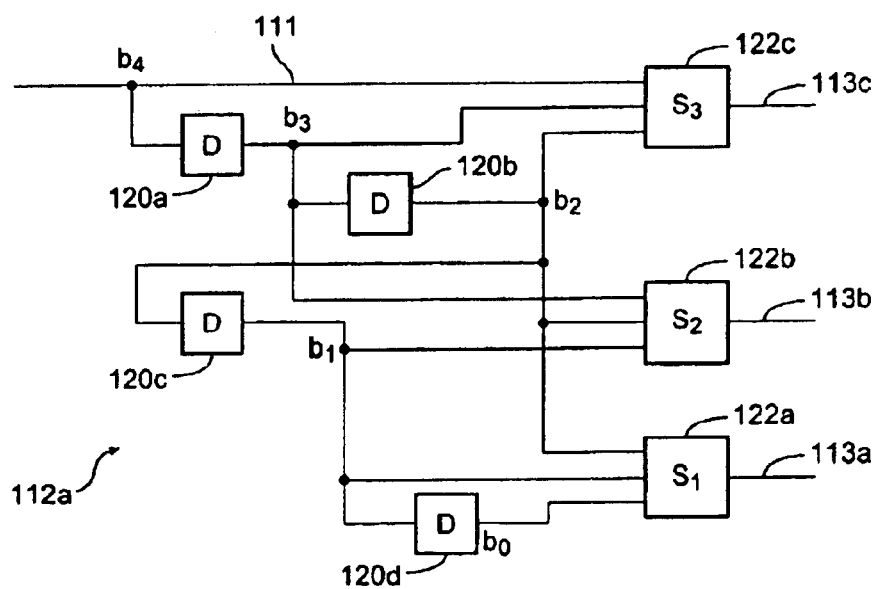
FIG. 3 is a block diagram of a first stage in the data extractor of FIG. 1 according to an embodiment of the present invention.

FIG. 3 is a block diagram of an embodiment 112a of the first stage 112 (see FIG. 2). The first stage 112a is designed for an oversampling rate of three. The first stage 112a includes four delay stages 120a, 120b, 120c and 120d, and three accumulator stages 122a, 122b and 122c. The oversampled data stream 111 is the input and the intermediate accumulation result 113 is the output. The delay stages 120 delay the oversampled data stream 111 such that each of the accumulators 122 sees a set of three adjacent samples. The accumulators 122 accumulate the results of sets of three adjacent samples. The first stage 112a may be used when the duty cycle is known to be correct, but the phase is unknown, and there may be phase jitter.

To find the best synchronization, n summation units 122 are used in the first stage, which all accumulate n samples over time. Their start points are offset by one sample each. Using the example with oversampling factor n=3:

1. Accumulator 122a adds together $b_0$, $b_1$ and $b_2$, providing its first intermediate accumulation result 113a. It will then accumulate $b_3$, $b_4$ and $b_5$ for its second result 113a, etc.

2. Accumulator 112b adds together $b_1$, $b_2$ and $b_3$ for its first intermediate accumulation result 113b, then accumulate $b_4$, $b_5$ and $b_6$ for its second result 113b, etc.

3. Accumulator 112c adds together $b_2$, $b_3$ and $b_4$ for its first intermediate accumulation result 113c, then accumulate $b_5$, $b_6$ and $b_7$ for its second result 113b, etc.

In general, the $n^{th}$ first stage accumulation for the $t^{th}$ data bit will be:

$$accu1_{n,i} = \sum_{i=0}^{n-1} b_n \cdot {}_{t+i+n-1}$$

The results will be +3 (that is, +1, +1, +1) and −3 (that is, −1, −1, −1) for the best synchronized of the n samples in the example, or {+n, −n} in general. For the others, it will be +3 and −3 if two consecutive data bits match, and lower values if they do not.

The data bits may be tapped from any desired point in the first stage 112a, such as from the input 111 or from an output from one or more of the delay stages 120.

Figure 4:
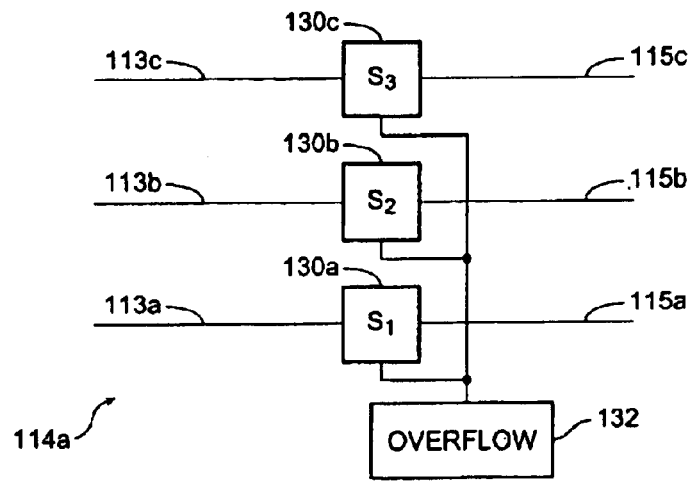
FIG. 4 is a block diagram of a second stage in the data extractor of FIG. 1 according to an embodiment of the present invention.

FIG. 4 is a block diagram of an embodiment 114a of the second stage 114 (see FIG. 2). The second stage 114a is designed for an oversampling rate of three. The second stage 114a includes three accumulator stages 130a, 130b and 130c and an overflow control circuit 132. The intermediate accumulation results 113 are the input and the final accumulation results 115 are the output. The accumulator stages 130a, 130b and 130c accumulate the respective intermediate accumulation results 113a, 113b and 113c. The overflow control circuit 132 keeps the accumulator stages 130 from overflowing.

In the second stage 114a, the signs of the intermediate accumulation results 113 are removed, and then the intermediate results are accumulated again, using a second set of n accumulators. The results may be represented by the following formula:

$$accu2_n = \sum_{t=0}^{\infty} accu1_{n,t}$$

Of this second set, one accumulator 130 will add n to its current value. The index of this accumulator 130 indicates the best alignment of the input data stream. The other accumulators 130 will add a number that is between 0 and n, depending on the oversampling factor and whether the bits in the data stream 111 match their neighbors. The accumulation result 115, assuming that at least one data bit does not match its predecessor, is therefore smaller than the result in the accumulator that is best aligned. Even if all databits were equal, the correct data message would be chosen, because synchronization would not matter.

The overflow control circuit 132 monitors the accumulators 130 and keeps them from overflowing. The overflow control circuit can do so in numerous ways, as desired according to the particulars of the implementation. One implementation of the overflow control circuit 132 is to deduct the value of the smallest accumulator from all the accumulators at every step or at another interval. Another implementation is to deduct a constant value from all accumulators if any accumulator exceeds a set threshold. Still another implementation is to accumulate n−x instead of n (that is, to accumulate n minus the number of matches instead of accumulating the number of matches, where x is the number of matches). That way the maximum in the highest accumulator would be zero, and all other accumulators would contain negative numbers, and clipping would be used.

Figure 5:
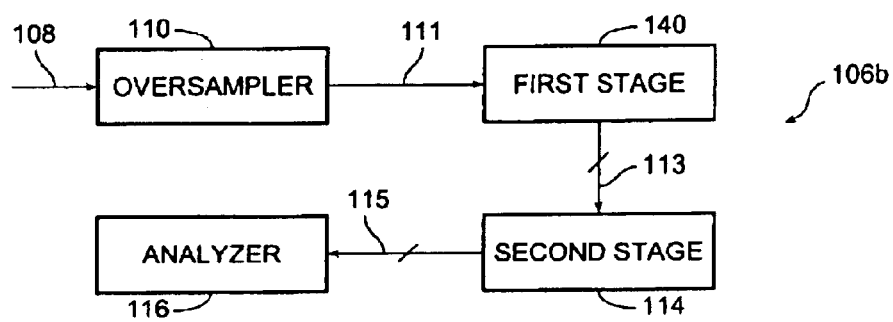
FIG. 5 is a block diagram of a data extractor according to an embodiment of the present invention.

FIG. 5 is a block diagram of a data extractor 106b according to another embodiment of the present invention. The data extractor 106b is similar to the data extractor 106a (see FIG. 2) with a different first stage (first stage 140 in FIG. 5 versus first stage 112 in FIG. 2). Otherwise the operation is similar. The embodiment of FIG. 5 is useful when the phase is unknown, there may be phase jitter, and the duty cycle is unknown (as compared to the embodiment of FIG. 2, which is useful when the duty cycle is known).

Using an example with an oversampling factor of 3, if the first stage accumulator sees (+1+1+1) or (−1−1−1), this is a good indication that the accumulator is aligned to the data stream, whereas patterns such as (+1+1−1), (−1−1+1), (+1−1−1) and (−1+1+1) indicate that the accumulator is not aligned. Special cases are the patterns (+1−1+1) and (−1+1−1). These patterns occur when the phase is correct and the accumulator is aligned, but the duty cycle is wrong. Hence these patterns also represent correct alignment.

The process may be described as finding the mirror axis for each symbol. When previous samples match next samples belonging to the same symbol, the mirror axis is found, and the synchronization is improved.

In general for the first stage 140 with oversampling factor n, where n is an odd number, the following equation gives the results:

$$accu1_{n,t} = \sum_{i=1}^{(n-1)/2} b_{n \cdot t+i} \cdot b_{n \cdot t-i}$$

Where n is an even number, the following equation gives the results:

$$accu1_{n,t} = \sum_{i=1}^{n/2} b_{n \cdot t+i} \cdot b_{n \cdot t-i+1}$$

The disadvantage of using an even number of samples per data bit is that in the ideal case, two accumulators will have the same result, and the ideal sample point would be in the middle between the two.

Note that the equations in the above description deal with the mathematical representation of the signal, that is {+1, −1}. In digital logic, the representation of the signal may be {0, 1}. Multiplications may then be performed by XORs, making the structure efficient to implement in digital logic.

Figure 6:
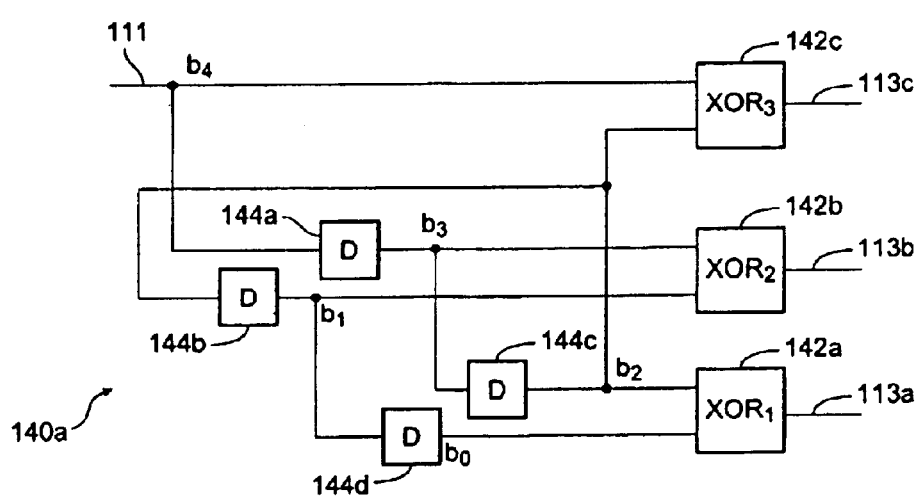
FIG. 6 is a block diagram of a first stage in the data extractor of FIG. 5 according to an embodiment of the present invention.

FIG. 6 is a block diagram of the first stage 140a according to one embodiment of the present invention, for an oversampling factor of 3. The first stage 140a includes three XOR blocks 142a, 142b and 142c, and flour delay stages 144a, 144b, 144c and 144d. Thus, the XOR block 142a provides the results for $b_0*b_2$, $b_3*b_5$, $b_6*b_8$, etc.

Figure 7:
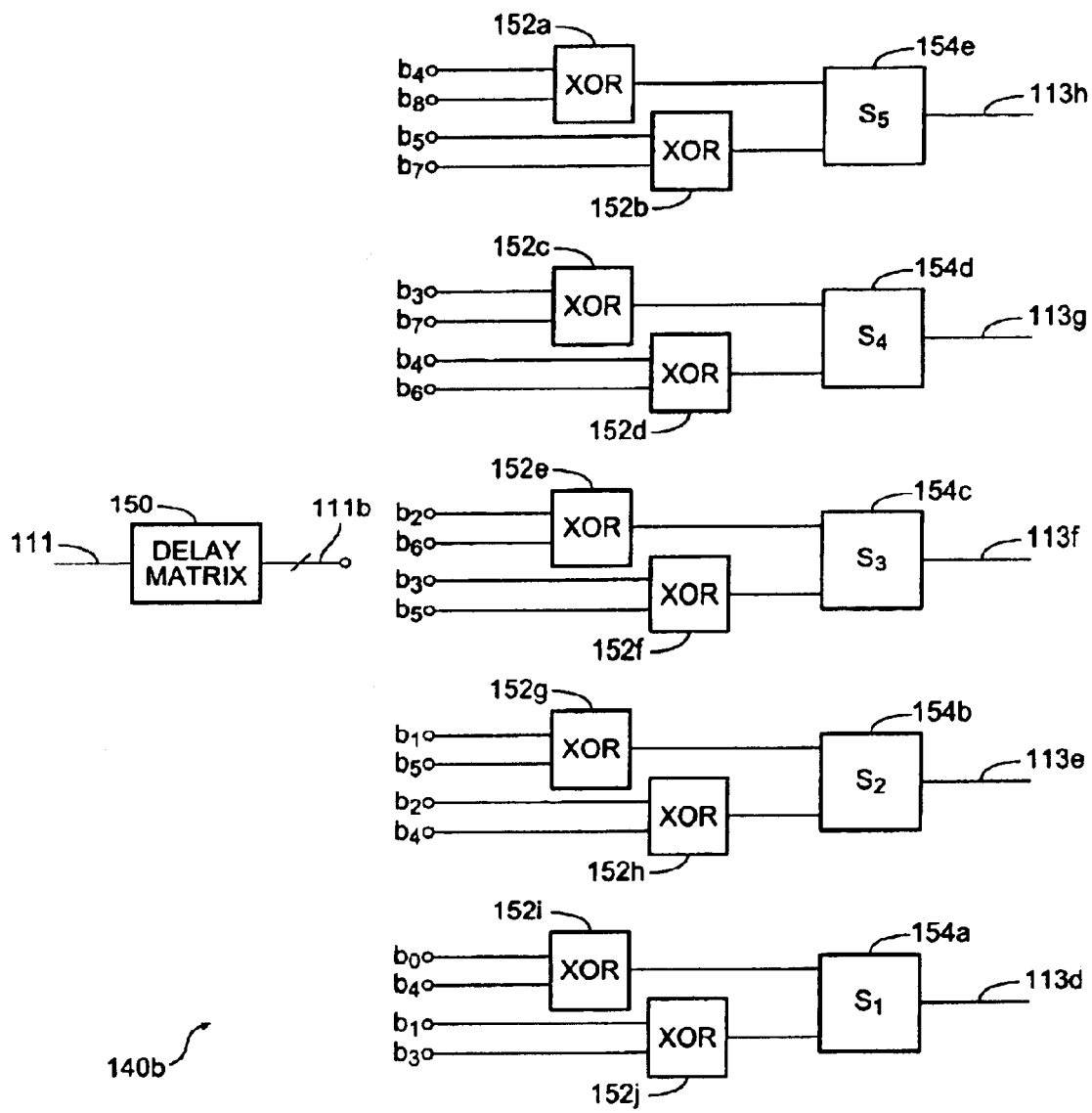
FIG. 7 is a block diagram of a first stage in the data extractor of FIG. 5 according to an embodiment of the present invention.

FIG. 7 is a block diagram of the first stage 140b according to another embodiment of the present invention, for an oversampling factor of 5. The first stage 140b includes a delay matrix 150, ten XOR blocks 152a–152j, and five accumulators 154a–154e. The delay matrix 150 delays the output data 111 and generates a plurality of delayed output data 111b. Each element in the delayed output data 111b is the output data delayed by one or more oversampled periods. These elements are then provided to the appropriate ones of the XOR blocks 152a–152j in order to implement the above equation. Thus, the first accumulator 154a provides the results for $b_0*b_{4+}b_1*b_3$, $b_5*b_{9+}b_6*b_8$, etc. (The delay matrix 150 may be implemented as individual delay blocks as in FIG. 6 if so desired.)

Although the above description has focused on specific embodiments, it is to be understood that numerous modifications, additions, changes and variations may be performed without departing from the scope of the present invention, which is defined by the following claims.

What is claimed is:

1. A method of extracting data from a data stream, comprising the steps of:
    oversampling said data stream at an oversampling rate and generating a plurality of data samples;
    processing said plurality of data samples and generating a plurality of first results, wherein said plurality of data samples is processed such that a set of two or more adjacent data samples is processed together, and wherein a number of elements in said set corresponds to said oversampling rate;
    processing said plurality of first results over time and generating a plurality of second results, wherein each of said plurality of first results is processed with others of said plurality of first results such that a number of said plurality of second results corresponds to said oversampling rate; and
    analyzing said plurality of second results and selecting an alignment of said plurality of data samples according to one of said plurality of second results.

2. The method of claim 1, wherein said oversampling rate is N times an expected rate of said data stream.

3. The method of claim 2, wherein said set contains N elements.

4. The method of claim 2, wherein N is said number of said plurality of second results.

5. The method of claim 1, wherein said plurality of data samples is processed such that similar ones of said set are added and dissimilar ones of said set are subtracted to result in one of said plurality of first results.

6. The method of claim 1, wherein said plurality of first results is processed such that a first one of said plurality of first results at a first time, and a second one of said plurality of first results at a second time, are added to result in one of said plurality of second results.

7. The method of claim 1, wherein said alignment is selected based on a largest-valued one of said plurality of second results.

8. The method of claim 1, wherein said alignment is selected based on a smallest-valued one of said plurality of second results.

9. An apparatus for extracting data from a data stream, comprising:
    an oversampler configured to oversample said data stream at an oversampling rate and to generate a plurality of data samples;
    a first plurality of processing elements, coupled to said oversampler, each configured to process, respectively, a set of two or more adjacent data samples of said plurality of data samples and to generate a plurality of first results, wherein a number of elements in said set corresponds to said oversampling rate;
    a second plurality of processing elements, coupled to said first plurality of processing elements, configured to process said plurality of first results over time and to generate a plurality of second results, wherein each of said plurality of first results is processed with others of said plurality of first results such that a number of said plurality of second results corresponds to said oversampling rate; and
    a comparator element, coupled to said oversampler and said second plurality of processing elements, configured to analyze said plurality of second results and to select an alignment of said plurality of data samples according to one of said plurality of second results.

10. The apparatus of claim 9, wherein said oversampling rate is N times an expected rate of said data stream.

11. The apparatus of claim 10, wherein said first plurality of processing elements contains N processing elements.

12. The apparatus of claim 10, wherein said second plurality of processing elements contains N processing elements.

13. The apparatus of claim 9, wherein one of said first plurality of processing elements is configured to process said set such that similar ones of said set are added and dissimilar ones of said set are subtracted to result in one of said plurality of first results.

14. The apparatus of claim 9, wherein one of said second plurality of processing elements is configured to process said plurality of first results such that a first one of said plurality of first results at a first time, and a second one of said plurality of first results at a second time, are added to result in one of said plurality of second results.

15. The apparatus of claim 9, wherein said comparator selects said alignment based on a largest-valued one of said plurality of second results.

16. The apparatus of claim 9, wherein said comparator selects said alignment based on a smallest-valued one of said plurality of second results.

17. The apparatus of claim 9, wherein said first plurality of processing elements comprises:
    a plurality of delay elements configured to delay said plurality of data samples and to generate a plurality of delayed data samples; and
    a plurality of accumulators, coupled to said plurality of delay elements, configured to accumulate selected ones of said plurality of delayed data samples and to generate said plurality of first results.

18. The apparatus of claim 9, wherein said second plurality of processing elements comprises:
    a plurality of accumulators configured to accumulate said plurality of first results over time and to generate said plurality of second results; and
    an overflow control circuit, coupled to said plurality of accumulators, configured to prevent said plurality of accumulators from overflowing.

19. A method of extracting data from a data stream, comprising the steps of:
    oversampling said data stream at an oversampling rate and generating a plurality of data samples;
    processing said plurality of data samples and generating a plurality of first results, wherein said plurality of data samples is processed such that a set of two or more nearby data samples is processed together, wherein a number of elements in said set corresponds to said oversampling rate, and wherein said set is processed according to a mirror axis of said set;
    processing said plurality of first results over time and generating a plurality of second results, wherein each of said plurality of first results is processed with others of said plurality of first results such that a number of said plurality of second results corresponds to said oversampling rate; and
    analyzing said plurality of second results and selecting an alignment of said plurality of data samples according to one of said plurality of second results.

20. An apparatus for extracting data from a data stream, comprising:
    an oversampler configured to oversample said data stream at an oversampling rate and to generate a plurality of data samples;
    a first plurality of processing elements, coupled to said oversampler, each configured to process, respectively, a set of two or more nearby data samples of said plurality of data samples and to generate a plurality of first results, wherein a number of elements in said set corresponds to said oversampling rate, and wherein said set is processed according to a mirror axis of said set;
    a second plurality of processing elements, coupled to said first plurality of processing elements, configured to process said plurality of first results over time and to generate a plurality of second results, wherein each of said plurality of first results is processed with others of said plurality of first results such that a number of said plurality of second results corresponds to said oversampling rate; and
    a comparator element, coupled to said oversampler and said second plurality of processing elements, configured to analyze said plurality of second results and to select an alignment of said plurality of data samples according to one of said plurality of second results.

21. The apparatus of claim 20, wherein said first plurality of processing elements comprises:

a plurality of delay elements configured to delay said plurality of data samples and to generate a plurality of delayed data samples; and a plurality of XOR blocks, coupled to said plurality of delay elements, configured to perform an XOR operation on selected ones of said plurality of delayed data samples and to generate said plurality of first results.

22. The apparatus of claim 20, wherein said first plurality of processing elements comprises:

a plurality of delay elements configured to delay said plurality of data samples and to generate a plurality of delayed data samples;

a plurality of XOR blocks, coupled to said plurality of delay elements, configured to perform an XOR operation on selected ones of said plurality of delayed data samples and to generate a plurality of intermediate results; and a plurality of accumulators, coupled to said plurality of XOR blocks, configured to accumulate selected ones of said plurality of intermediate results and to generate said plurality of first results.

23. The apparatus of claim 20, wherein said second plurality of processing elements comprises:

a plurality of accumulators configured to accumulate said plurality of first results over time and to generate said plurality of second results; and an overflow control circuit, coupled to said plurality of accumulators, configured to prevent said plurality of accumulators from overflowing.

24. A programmable logic device, comprising:

a plurality of function blocks, each configured to perform a respective function;

an interconnect configured to programmably connect said plurality of function blocks; and a data extractor, coupled to said plurality of function blocks via said interconnect, for extracting data from a data stream, including:

an oversampler configured to oversample said data stream at an oversampling rate and to generate a plurality of data samples;

a first plurality of processing elements, coupled to said oversampler, each configured to process, respectively, a set of two or more adjacent data samples of said plurality of data samples and to generate a plurality of first results, wherein a number of elements in said set corresponds to said oversampling rate;

a second plurality of processing elements, coupled to said first plurality of processing elements, configured to process said plurality of first results over time and to generate a plurality of second results, wherein each of said plurality of first results is processed with others of said plurality of first results such that a number of said plurality of second results corresponds to said oversampling rate; and a comparator element, coupled to said oversampler and said second plurality of processing elements, configured to analyze said plurality of second results and to select an alignment of said plurality of data samples according to one of said plurality of second results.

25. A programmable logic device, comprising:

a plurality of function blocks, each configured to perform a respective function;

an interconnect configured to programmably connect said plurality of function blocks; and a data extractor, coupled to said plurality of function blocks via said interconnect, for extracting data from a data stream, including:

an oversampler configured to oversample said data stream at an oversampling rate and to generate a plurality of data samples;

a first plurality of processing elements, coupled to said oversampler, each configured to process, respectively, a set of two or more nearby data samples of said plurality of data samples and to generate a plurality of first results, wherein a number of elements in said set corresponds to said oversampling rate, and wherein said set is processed according to a mirror axis of said set;

a second plurality of processing elements, coupled to said first plurality of processing elements, configured to process said plurality of first results over time and to generate a plurality of second results, wherein each of said plurality of first results is processed with others of said plurality of first results such that a number of said plurality of second results corresponds to said oversampling rate; and a comparator element, coupled to said oversampler and said second plurality of processing elements, configured to analyze said plurality of second results and to select an alignment of said plurality of data samples according to one of said plurality of second results.

\* \* \* \* \*